United States Patent [19]
Partida

[11] Patent Number: 5,674,543
[45] Date of Patent: Oct. 7, 1997

[54] DOUGH SHEETER WITH IMPROVED PINCH-POINT ADJUSTMENT MECHANISM

[75] Inventor: Agustin G. Partida, Bellflower, Calif.

[73] Assignee: Casa Herrera, Inc., Pomona, Calif.

[21] Appl. No.: 552,093

[22] Filed: Nov. 2, 1995

[51] Int. Cl.$^6$ ................................................ B29C 43/24
[52] U.S. Cl. ........................... 425/367; 100/168; 100/169
[58] Field of Search ........................... 425/367, 141, 425/194; 100/168, 169

[56] References Cited

U.S. PATENT DOCUMENTS

| | | | |
|---|---|---|---|
| 3,605,687 | 9/1971 | Russell | 100/169 |
| 3,936,258 | 2/1976 | Lake | 425/367 |
| 4,021,179 | 5/1977 | Pira et al. | 425/367 |
| 4,233,997 | 11/1980 | Quester et al. | 100/169 |
| 4,997,358 | 3/1991 | Perkins et al. | 425/367 |
| 5,180,593 | 1/1993 | Mistretta et al. | |
| 5,268,187 | 12/1993 | Quinlan | 425/367 |
| 5,336,007 | 8/1994 | Waldherr et al. | |
| 5,404,811 | 4/1995 | Schiel et al. | 100/168 |

OTHER PUBLICATIONS

Casa Herrera product disclosure for #21—"Magna 54" Sheeting Head (date unknown).

*Primary Examiner*—Khanh P. Nguyen
*Attorney, Agent, or Firm*—Joseph C. Andras

[57] ABSTRACT

An improved pinch-point gap adjustment mechanism for a dough sheeter having two counterrotating rollers, one of which is horizontally moveable, is disclosed. The pinch-point gap adjustment mechanism incorporates a lever-action arrangement to provide mechanical assistance to an operator adjusting the pinch-point gap. The lever-action incorporated by the current invention distributes input forces for pinch-point gap adjustment across the height of the moveable roller. The disclosed invention allows for smoother pinch-point gap adjustment such that binding of the slider plates is minimized. The preferred sheeter head assembly permits an operator to release the front roller from the same operator location as where adjustments to the pinch-point gap are made.

10 Claims, 5 Drawing Sheets

DOUGH SHEETER WITH IMPROVED PINCH-POINT ADJUSTMENT MECHANISM

BACKGROUND OF THE INVENTION

1. Field of the Invention

This invention relates generally to food processing machinery and, more specifically, to a dough sheeter for transforming a mass of dough into a dough sheet. Said dough sheeter is characterized by a pair of counterrotating rollers having a pinch-point adjustment mechanism characterized by a lever-action arrangement for easy adjustment of the pinch-point between said rollers.

2. Description of Related Art

"Dough sheeters," or "sheeting heads," are used in the production of food products such as tortillas, pita bread, and snack chips. In a conventional arrangement, sheeting heads are used to form raw dough, such as from masa, into relatively thin sheets from which the tortillas and other food products, such as snack chips are then cut. The typical sheeting head comprises a pair of parallel counterrotating rollers, rotating on a horizontal axis.

A mass of dough is loaded into the top of the dough sheeter, where it is pinched between the rollers, thereby being formed into a thin sheet. Varying dough sheet thicknesses are achieved by varying the gap between the two rollers; this is the pinch-point gap. Additionally, it is routine to release, or move one roller away from the other roller, so that the rollers can be cleaned, such as prior to changing dough mixture, or for other maintenance.

In many prior art dough sheeters, pinch-point gap adjustment is accomplished by the direct-drive worm-screw arrangement shown in FIG. 1. As shown, the back roller 20 and front roller 70 are supported by face pieces 30 that include bearing assemblies (not shown). The face pieces 30 that support the back roller 20 are attached to slider plates 40 which permit the back roller 20 to slide horizontally closer to, or further from the front roller 70. As the back roller 20 is moved further from the front roller 70, the pinch-point gap between the two rollers is increased.

Adjustment of the pinch-point gap in the prior art mechanism shown is accomplished by turning the adjusting shafts 60, the threaded engagement between the adjusting shafts 60 and the release bar 50 converting rotational motion to translational motion. Turning the adjustment shafts 60, therefore, results in horizontal movement of the slider plates 40 and each end of the back roller 20.

The back roller 20 can be released, in the prior art mechanism shown, by lifting the release handles 80. As the release handles 80 are lifted, the release bar 50 will rotate and raise, such that the axes of the adjusting shafts 60 will begin to angle downwardly. This motion causes the slider plates 40 to be pulled closer to the back of the sheeter head and a large gap to be rapidly created between the two rollers.

Dough sheeters vary in size for different applications. The corresponding rollers can range in size from several inches to several feet. The larger the rollers, the heavier the rollers, and the more force required to adjust the pinch-point gap. The roller, slider plates, and bearing assemblies can weigh as much as 1,000 pounds, or more.

Because the old adjustment mechanism exerts a direct force across the axis of the back roller 20, there is very little mechanical advantage provided to the human operator. As the back rollers 20 became larger, and therefore heavier, more and more force was required to make pinch-point gap adjustments; binding of the slider plates 40 sometimes occurs, thereby making pinch-point gap adjustments even more difficult.

In addition to making it difficult to make manual adjustments, the prior art pinch-point adjustment mechanisms have made it impractical to implement automatic pinch-point adjustment mechanisms, such as hydraulically or electro-mechanically.

One desirable feature of the prior art sheeter head shown is the ability to operate the machine from a single operator location. In order to meet this criteria, the operator should be able to make adjustments to the pinch-point gap and release the back roller 20 from the same location (with respect to the sheeter head).

OBJECTS AND SUMMARY OF THE INVENTION

In light of the aforementioned problems associated with the prior art, it is an object of the present invention to provide an improved dough sheeter pinch-point gap adjustment mechanism having a lever-action arrangement to provide mechanical assistance to an operator adjusting the pinch-point gap;

It is a further object of this invention to distribute the input force for pinch-point gap adjustment across the height of the back roller;

It is a further object of this invention to provide a pinch-point gap adjustment mechanism that allows for smoother pinch-point gap adjustment such that binding of the slider plates is minimized; and It is a further object of this invention to provide a sheeter head assembly that permits an operator to release the front roller from the same operator location as where adjustments to the pinch-point gap are made.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the an, since the generic principles of the present invention have been defined herein specifically to provide a dough sheeter having an improved pinch-point gap adjusting mechanism.

Figure 1:
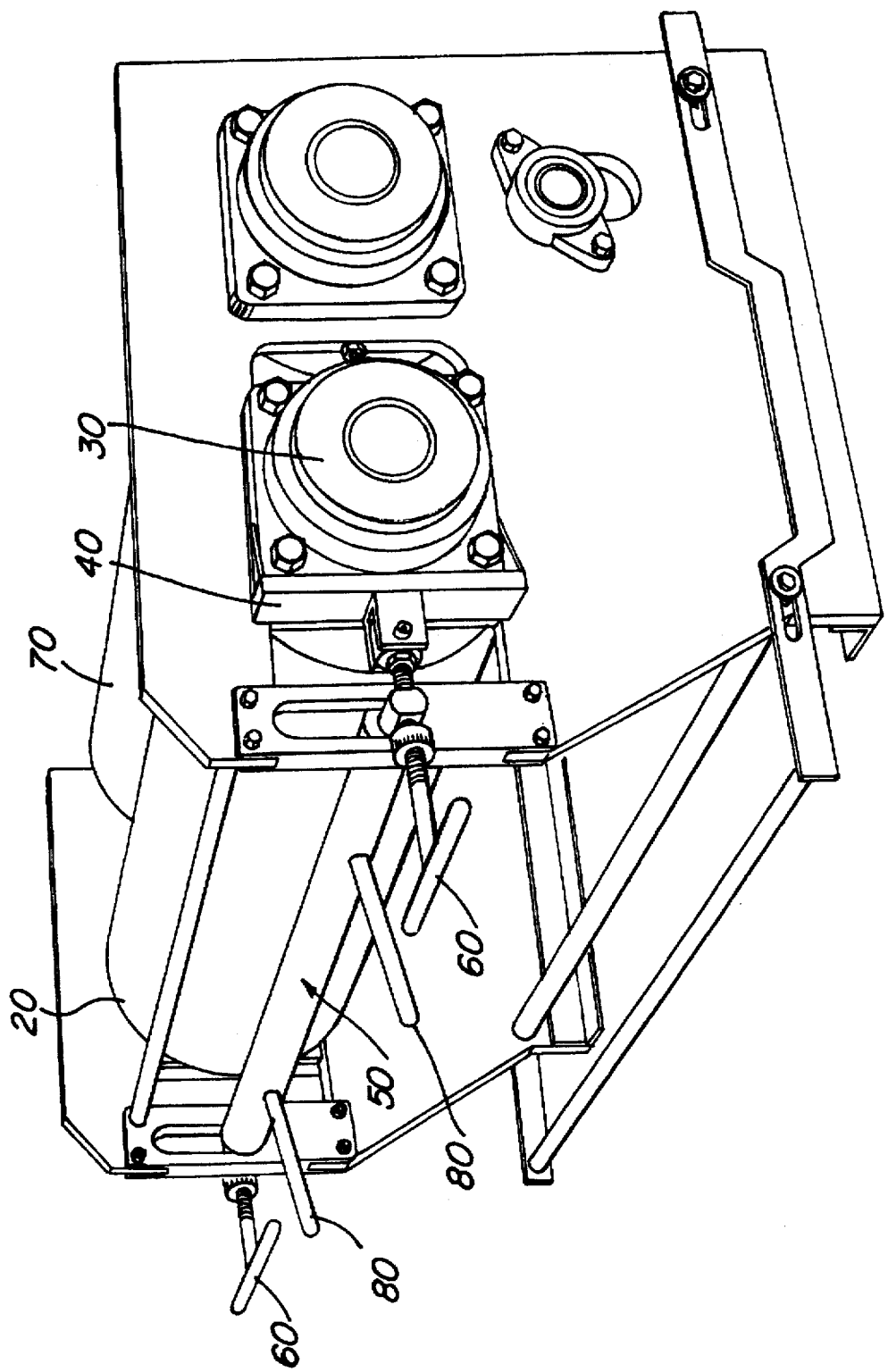
FIG. 1 is a perspective view of a prior art sheeter head incorporating a prior art pinch-point gap adjustment mechanism.
Figure 2:
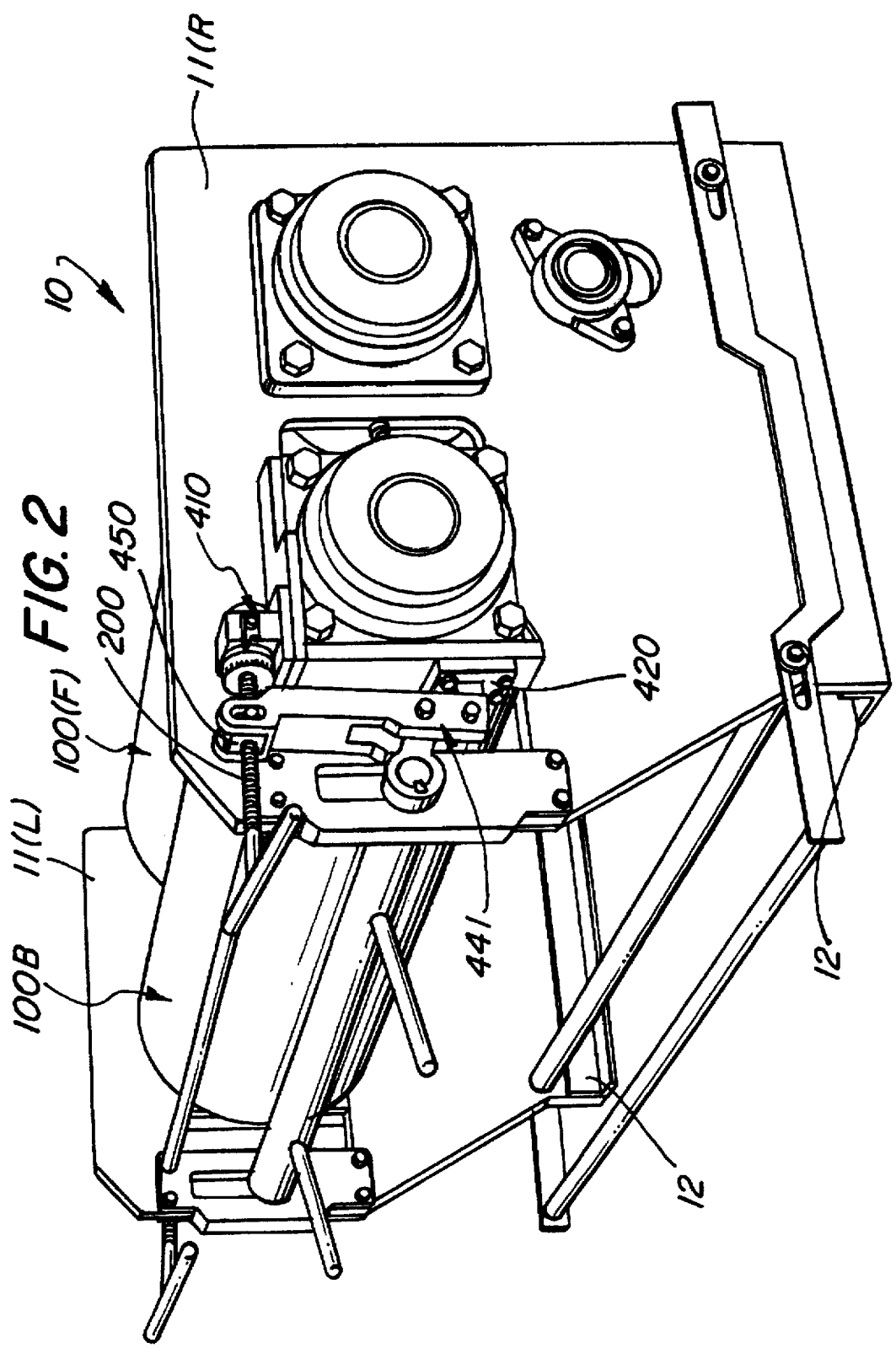
FIG. 2 is a perspective view of a sheeter head incorporating a preferred embodiment of the improved pinch-point adjustment mechanism.
Figure 3:
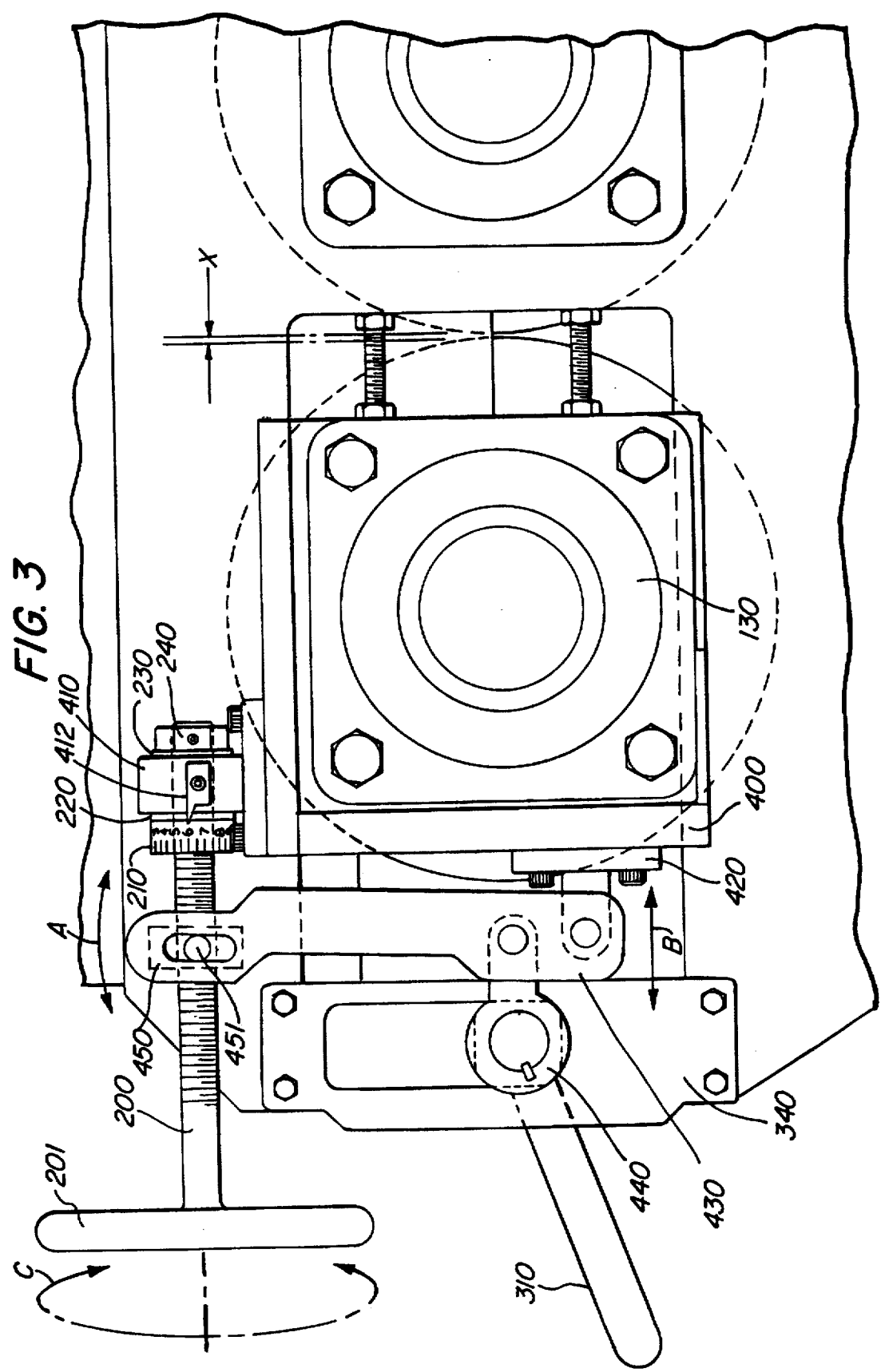
FIG. 3 is a partial side view of the sheeter head of FIG. 2, with the preferred embodiment of the improved pinch-point gap adjustment mechanism.

A sheeter head 10 incorporating the present invention is best understood by initial consideration of FIG. 2. The sheeter head 10 comprises left and right side plates 11(L) and 11(R), and a pair of counterrotating rollers, a front roller 100(F) and a back roller 100(B). The sheeter head 10 preferably rests on a base 12. A critical feature of the present invention is the location of the adjusting shaft 200 with respect to the axis of the back roller 100(B). As shown in FIG. 2, the adjusting shaft 200 is in a different horizontal plane than the axis of the back roller 100(B). Turning the adjusting shaft 200 ("C") exerts two equal and opposite forces; one force concentrated at the drive block 450 and the other at the upper bracket 410. 10 Additionally, the force on the drive block 450, and resultant deflection ("A), results in another force acting at the lower bracket 420. The drive block force and deflection and the lower bracket force and lower bracket deflection ("B") are balanced across a release lever pin 441. The ratio of the lower bracket force and deflection to the upper bracket force and deflection is directly proportional to the ratio of their respective longitudinal distances from the release lever pin 441. As depicted by FIG. 3, the improved pinch-point adjustment mechanism operates in somewhat of a scissor-like fashion such that the adjusting force is distributed across the height of the back roller 100(B) and provides the operator with mechanical assistance from the lever-action of the lever arm 430. This lever-action arrangement provides for smoother adjustment of the pinch-point gap "X" and improves and operator's ability to overcome the added difficulty in making adjustments to a large, heavy back roller 100(B), or if the slider plates 400 happen to bind.

Figure 5:
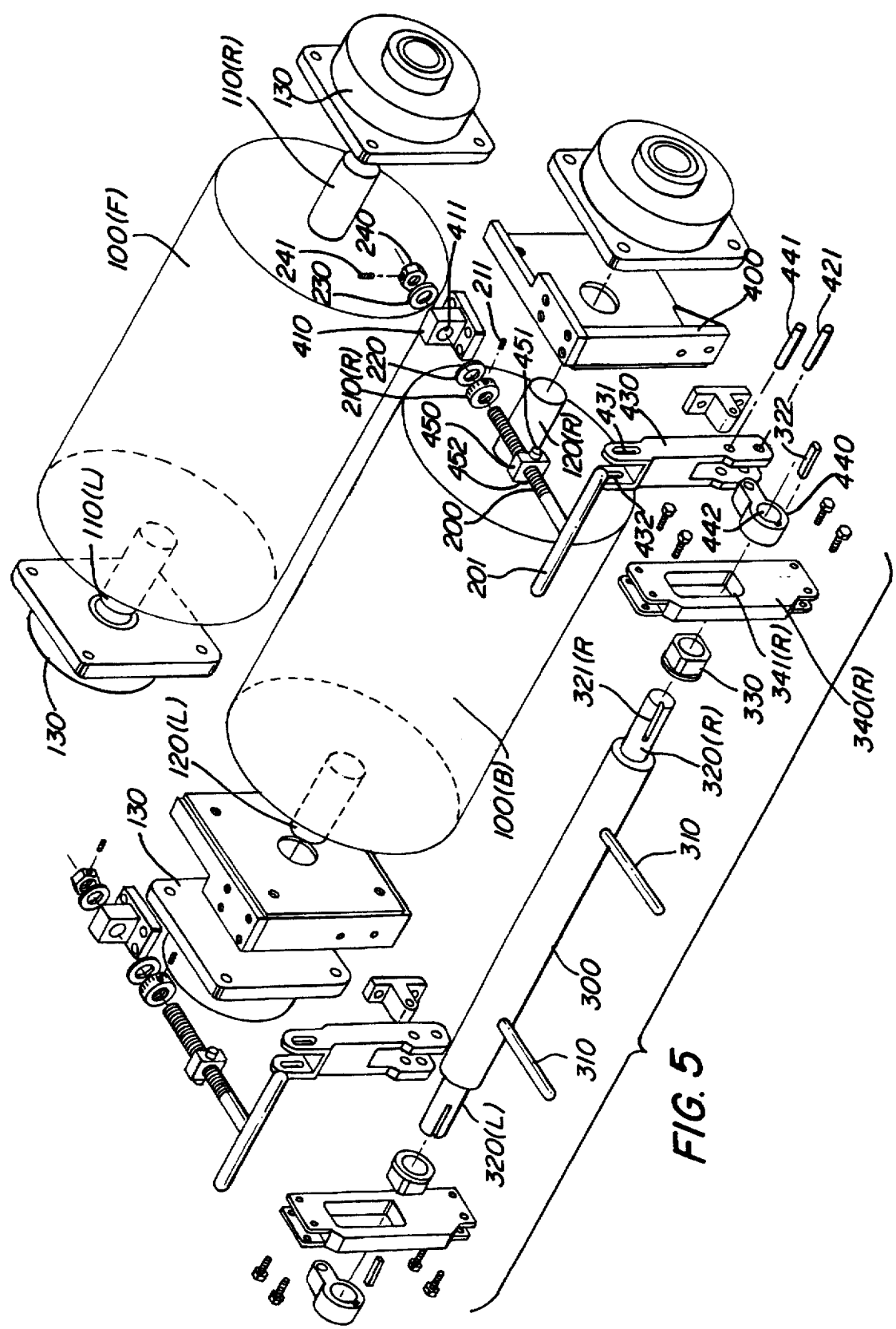
FIG. 5 is an exploded perspective view of the preferred embodiment of the present invention, including the front roller 100(F) and back roller 100(B).

FIG. 5 is an exploded perspective view of the instant invention presented to show all components comprising the preferred embodiment of the adjustment mechanism. The adjusting shaft 200 is rotatably connected to the upper bracket 410 by compressing a first washer 220, the upper bracket 410, and a second washer 230 between a scale ring, for example 210(R) and the retaining nut 240. The scale ring 210 and a retaining nut 240 are rigidly attached to the adjusting shaft 200 by set screws 211 and 241, respectively. The adjusting shaft 200 terminates, at the end opposite the retaining nut, in an adjusting handle 201. The adjusting handle 201 can be a T-bar, handwheel or other means for applying force inputs to the adjustment mechanism, including automated systems such as hydraulic or electromechanical systems.

The scale ring 210 has indicia, such as tick marks and numbering, around its circumference, to represent relative movements of the pinch-point gap "X". Attached to the upper bracket 410 is an indicator needle 412 that is aligned to point to the indicia on the scale ring 210 to provide initial and final reference points for an operator making a pinch-point gap adjustment.

The preferred upper bracket 410 is fixedly attached to the slider plate 400. The slider plate 400 rests on the frame 13 such that the slider plate 400 can slide with respect to the frame 13 (see FIG. 3). Attached to the slider plate 400 is a face piece 130, that further comprises a bearing assembly for supporting one end of the back roller 100(B).

A drive block 450 having an internally threaded bore and pegs 451 and 452 is threadedly engaged with the threaded portion of the adjusting shaft 200. The drive block 450 slides and vertically and between the upwardly forked portion of the lever arm 430, but the drive block 450 is restrained from horizontal rotation. The pegs 451 and 452 extend through the opposing peg grooves 431 and 432 in the lever arm 430 such that rotation of the adjusting shaft 200 causes translational movement of the drive block 450 along the axis of the adjusting shaft 200. The engagement between the pegs 451 and 452 and the peg grooves 431 and 432 permits pivotal and sliding motion between the drive block 450 and the lever arm 430 such that input forces are mechanically enhanced and distributed evenly to provide smooth, easy operation and resistance to binding.

The lower bracket 420 is pivotally attached to the lower end of a downwardly forked portion of the lever arm 430 by a lower bracket pin 421. The lower bracket 420 is fixedly attached to a lower periphery of the slider plate 400. This lower bracket 420 provides a second force input to the slider plate 400 during pinch-point gap adjustment or when releasing the back roller 100(B). Other embodiments may call for additional force input locations, as well as varying the distance(s) between force input points, such as between the upper bracket 410 and the lower bracket 420 in order to further change the force distribution across the slider plate 400.

A release lever 440 is pivotally attached to the lever arm 430 by the release lever pin 441 at a point between the peg grooves 431 and 432 (at the top of the lever arm 430) and the lower bracket pin 421 (at the bottom of the lever arm 430). Because the force distribution across the slider plate 400, as described above, is effected by the actual and relative distances between the release lever pin 441, the peg grooves 431 and 432, and the lower bracket pin 421, different embodiments may incorporate different dimensions. In the instant embodiment, the preferred release lever is about 9 inches long and the preferred distance from the release lever pin 441 to the peg grooves 431 and 432 is 6.75 inches, about six times the distance from the release lever pin 441 to the lower bracket pin 421 of 1.125 inches. The preferred release lever 440 also comprises a transversely bored end 441 for engaging with a right end 321(R) of the release bar 300, for example. The release lever bore 421, in the preferred embodiment, includes a keyway 422 for insertion of a key 322 to prohibit rotation between the release lever 440 and the release shaft bar 300.

As described above, inserted in the release lever 440 is the release bar 300, having opposing ends 320(R) and 320(L). In the preferred embodiment, these ends 320 include keyways 321(R) and 321(L) to receive a key 322. A retaining sleeve 330 fits over each of the ends 320 and permits rotation by the end 320 and, consequently, the release bar 300. Extending radially from the release bar 300 is at least one release handle 310 that permits an operator to lift the release handle(s) 310 and thereby release the back roller 100(B) for cleaning or other maintenance. The release handle(s) 310 are positioned such that an operator can make adjustments to the pinch-point gap and also release the back roller 100(B) from the same operating area.

Figure 4:
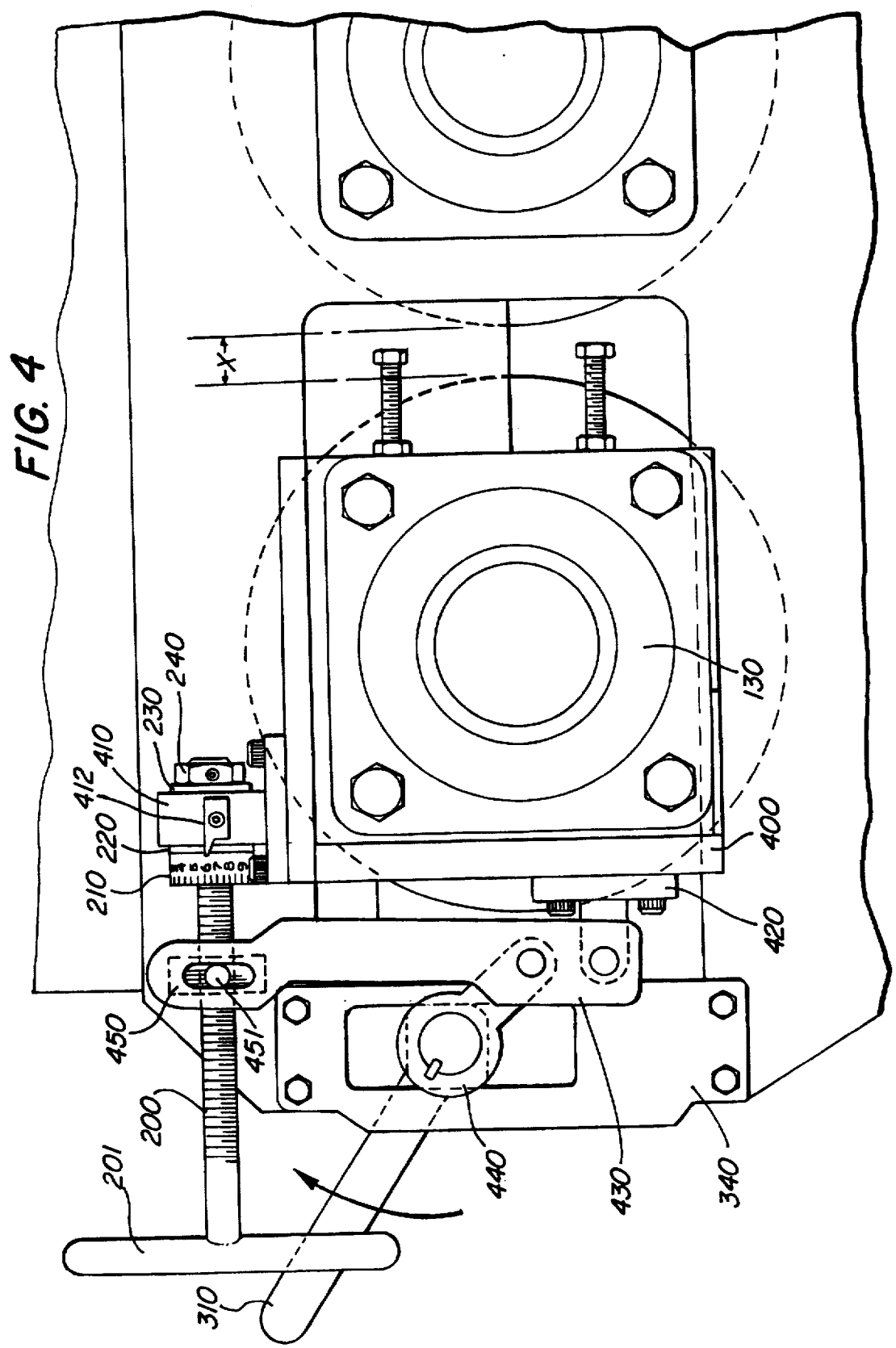
FIG. 4 is a partial side view, like FIG. 3, but with the release bar raised.

The retaining sleeves 330 are inserted in, and are permitted to slide vertically within grooves 341(R) and 341(L) that are respectively located within retaining plates 340(R) and 340(L); these retaining plates are attached to the frame 13 as best shown in FIGS. 3 and 4.

FIG. 3 is a partial side view of a preferred pinch-point gap adjustment mechanism in the operating position. In this view, the release bar 300 is in its lowered position and the pinch-point gap "X" is indicative of a typical relatively small pinch-point gap that is used while dough is being fed through the sheeter head and pressed onto a thin sheet.

FIG. 4 is a partial side view of a preferred pinch-point gap adjustment mechanism in the released position. In this view, the release bar 300 is in its raised position ("D) and the pinch-point gap "X" is widened so that cleaning or other maintenance can be conducted on the front and back rollers (shown in hidden lines).

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A pinch-point gap adjustment mechanism for an apparatus having a frame supporting a pair of substantially parallel rollers, said adjustment mechanism comprising:
   means for releasing one of the rollers; and
   means for positioning one of the rollers in relation to the other roller comprising a lever arm that is pivotally attached to the releasing means for distributing a positioning force to each end of one of the rollers.

2. The pinch-point gap adjustment mechanism of claim 1, further comprising:
   a slider plate at each end of one of the rollers for supporting the roller and permitting horizontal movement of the roller;
   a lower attachment means for attaching said lever arm to said slider plate; and
   an upper attachment means for attaching said positioning means to said slider plate.

3. The pinch-point gap adjustment mechanism of claim 2, wherein:
   said slider plate further comprises a plurality of corners; and
   said lower attachment means and said upper attachment means are disposed adjacent to different corners of said slider plate.

4. The pinch-point gap adjustment mechanism of claim 3 wherein said positioning means is further comprised by an adjusting shaft located in a different horizontal plane than the axis of the two rollers.

5. The pinch-point gap adjustment mechanism of claim 4 wherein said slider plate further comprises a top edge and the axis of said adjusting shaft is adjacent to said top edge of said slider plate.

6. The pinch-point gap adjustment mechanism of claim 2 wherein said positioning means is further comprised by an adjusting shaft rotatably attached to said upper attachment means whereby the only relative motion permissible between said adjusting shaft and said upper attachment means is rotation in the horizontal plane.

7. The pinch point gap adjustment mechanism of claim 6, wherein:
   said slider plate further comprises a plurality of corners and a top edge;
   said lower attachment means and said upper attachment means are disposed adjacent to different corners of said slider plate;
   said positioning means is further comprised by an adjusting shaft located in a different horizontal plane than the axis of the two rollers;
   the axis of said adjusting shaft is adjacent to said top edge of said slider plate; and
   the adjustment mechanism further comprises a lower attachment means for attaching said lever arm to said slider plate.

8. An improved pinch-point gap adjustment mechanism for a dough sheeter having a frame supporting a pair of substantially parallel rollers aligned to form a pinch-point, comprising:

a pair of retaining plates attached to the frame, each retaining plate further defined by a groove;

a release bar slidingly inserted into said grooves;

a pair of release lever, each of said release levers attached to opposing ends of said release bar;

a pair of lever arms, each of said lever arms pivotally attached to opposing ends of said release bar;

a pair of drive blocks, each of said drive blocks pivotally attached to one of said lever and further defined by an internally threaded bore;

a pair of adjusting shafts, each of said adjusting shafts having a first end and a second end, terminating in an adjusting handle at said first end, including an externally threaded portion adjacent to said second end, and threadedly engaged with said internally threaded bore of one of said drive blocks;

a pair of upper brackets, each of said upper brackets comprising an attaching means for rotatably attaching an upper bracket to one of said adjusting shafts such that rotating said adjusting shaft results in axial movement by said upper bracket relative to said adjusting shaft;

a pair of lower brackets, each of said lower brackets pivotally attached to one of said lever arms;

a pair of slider plates, each of said slider plates attached to one said upper bracket and one said lower bracket; and a pair of face pieces, each of said face pieces attached to one of said slider plates, and further comprising a roller bearing assembly for supporting one of the rollers, whereby rotation of said adjusting shaft results in a front-to-back movement of one roller such that there is a resulting change the pinch-point gap between the two rollers.

9. The improvement recited in claim 8, wherein:

said release bar terminates in opposing ends, and is further defined by a plurality of release handles extending substantially radially from said release bar, each of said ends further defined by a keyway and a release shaft key, and each of said release shafts slidingly inserted into said grooves;

each of said release levers further comprises an internal bore including a keyway, and is attached to one of said ends, wherein said keyway is aligned with said release shaft key;

each of said lever arms further includes at least two peg grooves;

each of said drive blocks is further defined by at least two pegs, said pegs slidingly inserted into said peg grooves; and each of said lower brackets is pivotally attached to one of said lever arms by a lower bracket pin.

10. The improvement recited in claim 9, further comprising:

a pair of retaining sleeves, each of said retaining sleeves slidingly inserted over each of said ends and inside of each of said grooves;

a pair of scale rings, each of said scale rings comprising an internally threaded bore, an outer radial surface, a set screw, and further defined by indicia disposed around substantially all of said radial surface, said scale ring threadedly engaged with said threaded portion of said adjusting shaft and rotationally affixed by engagement of said set screw with said adjusting shaft;

a pair of first washers, each of said first washers slidingly attached over said threaded portion of one of said adjusting shafts adjacent to said scale rings;

at least one indicator needle attached to said upper bracket and extending above said scale rings whereby rotation of said scale rings will align said indicator needles with said indicia;

a pair of second washers slidingly attached over said threaded portions of one of said adjusting shafts adjacent to said upper brackets; and a pair of retaining nuts, each of said retaining nuts having an internally threaded bore and a set screw, said bores threadedly engaged with said threaded portions of each of said adjusting shafts and rotationally affixed by engagement of said set screws with said adjusting shafts whereby said first washers, said upper brackets and said second washers are compressed between said scale rings and said retaining nuts.

* * * * *